United States Patent
Karlsson

(10) Patent No.: US 9,157,983 B2
(45) Date of Patent: Oct. 13, 2015

(54) METHOD FOR REAL-TIME, AUTOMATIC, WIDEBAND, HIGH ACCURACY RF DIRECTION FINDING

(71) Applicant: Lars Karlsson, Santa Clara, CA (US)

(72) Inventor: Lars Karlsson, Santa Clara, CA (US)

(73) Assignee: SPECTRANETIX, INC., Santa Clara, CA (US)

( * ) Notice: Subject to any disclaimer, the term of this patent is extended or adjusted under 35 U.S.C. 154(b) by 385 days.

(21) Appl. No.: 13/653,476

(22) Filed: Oct. 17, 2012

(65) Prior Publication Data
US 2014/0104110 A1 Apr. 17, 2014

(51) Int. Cl.
*G01S 5/02* (2010.01)
*G01S 3/74* (2006.01)

(52) U.S. Cl.
CPC ..................................... *G01S 3/74* (2013.01)

(58) Field of Classification Search
CPC .................................. G01S 5/02; G01S 5/04
USPC ......................................... 342/417, 437, 444
See application file for complete search history.

(56) References Cited

U.S. PATENT DOCUMENTS

| | | | |
|---|---|---|---|
| 5,687,196 A * | 11/1997 | Proctor et al. | 375/347 |
| 2006/0227050 A1 * | 10/2006 | Vaughn | 342/444 |
| 2012/0327516 A1 * | 12/2012 | Abbaspour-Tamijani | 359/619 |

\* cited by examiner

*Primary Examiner* — Harry Liu
(74) *Attorney, Agent, or Firm* — Steins & Associates, P.C.

(57) ABSTRACT

This system and method provides a direction finding system that enables modern RF DF systems to analyze short duration signals in the entire instantaneous bandwidth. By providing a method to process wideband data, the invention drastically improves throughput and probability of intercept (POI). The invention is unique in that it does not require separate narrowband channels for analysis, and can simultaneously calculate azimuth and elevation estimates for every frequency in the bandwidth of an incident signal. It is also well-suited for fixed point, FPGA implementations making it a perfect match for modern state-of-the-art processing systems. The system and method capitalizes on the ability of Fourier Frequency Transform operations to accurately resolve incident wave phase at discrete frequencies. The system then uses the phase information from the individual elements in the array to arrive at an emitter azimuth angle. The azimuth angle is nearly simultaneously used in concert with lookup tables of all possible elevation angles to compare the arrival time delay between the array elements to determine emitter elevation angle.

12 Claims, 4 Drawing Sheets

METHOD FOR REAL-TIME, AUTOMATIC, WIDEBAND, HIGH ACCURACY RF DIRECTION FINDING

This application is filed within one year of, and claims priority to Provisional Application Ser. No. 61/548,112, filed Oct. 17, 2011.

BACKGROUND OF THE INVENTION

1. Field of the Invention

This invention relates generally to signal transmitter locating systems and, more specifically, to a Method for Real-time, Automatic, Wideband, High Accuracy 3D RF Direction Finding.

2. Description of Related Art

This patent application describes an enhanced method for locating radio frequency signal emitters.

Today's high frequency direction finding systems perform well in situations that require analysis on very few frequencies and when target signals are of constant frequency and long duration. However, these systems suffer from serious performance and cost issues in the face of short duration signals or situations that require analysis of the entire RF band. A modern RF DF system should process entire receiver bandwidths at speeds that enable it to analyze modern, short duration signals without introducing enormous hardware requirements and costs.

Current Direction Finding systems are narrow-band in nature, possessing bandwidths of a few Kilohertz (KHz) and requiring many RF receiver channels and DSP processors to digitize and process each narrowband channel. The results are then later stitched together. This approach is very costly for the subset of real-world applications, often referred to as wideband applications, which require the analysis of large segments of the Electromagnetic Spectrum. Generally, to keep costs down, fewer receiver channels are used which adversely effects processing efficiency as the system can only process small amounts of bandwidth simultaneously. In addition, further serial processing is required if elevation and azimuth are desired compounding both cost and efficiency problems.

What is needed therefore, in order to feasibly determine the angle of arrival (AoA) of RF emitters as efficiently as possible is a method that not only (1) operates on wideband data provided by a single receiver channel doing work that would normally require thousands of separate receivers, but also (2) calculates both azimuth and elevation results at numerous frequencies in parallel. Multipath results in errors in the determination of the arrival angles. By increasing the size of the antenna array so its diameter is larger than the wavelength substantial reduction of the multipath errors can be achieved. When the array diameter is larger than half the wavelength then special methods have to be applied in order to remove the ambiguities in the received relative phases. This patent application describes such a method.

SUMMARY OF THE INVENTION

In light of the aforementioned problems associated with the prior devices and systems, it is an object of the present invention to provide a Method for Real-time, Automatic, Wideband, High Accuracy 3D Direction Finding.

This invention seeks to provide a direction finding system and method that will enable modern RF DF systems to analyze short duration signals in the entire RF band. By providing a method to process wideband data, the invention should drastically improve throughput and probability of intercept (POI). The invention is unique in that it does not require separate narrowband channels for analysis, and can simultaneously calculate azimuth and elevation estimates for every frequency in the entire bandwidth of an incident signal. It is also well-suited for fixed point, FPGA implementations making it a perfect match for modern state-of-the-art processing systems.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method for Real-time, Automatic, Wideband, High Accuracy RF Direction Finding.

Figure 1:
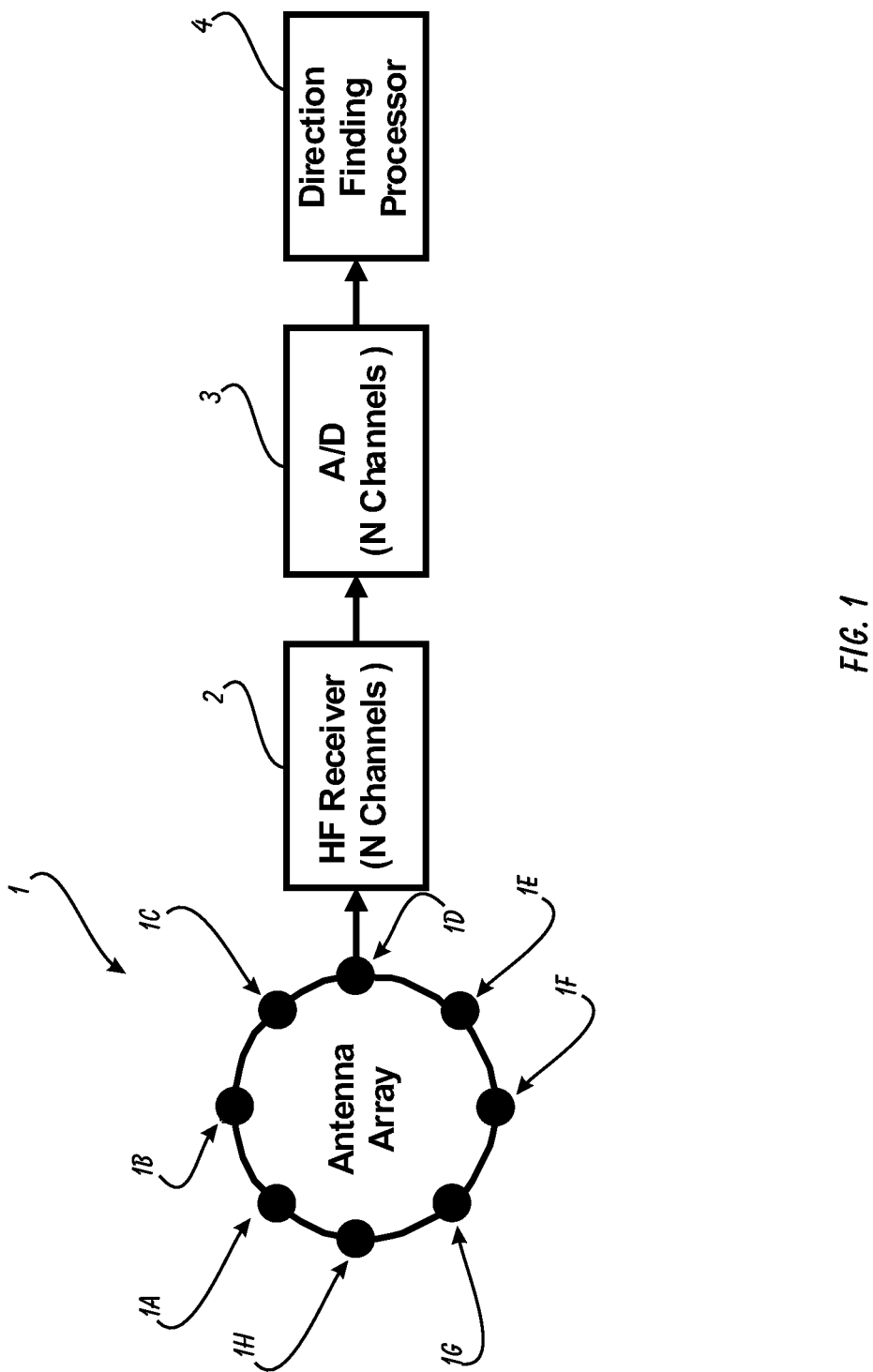
FIG. 1 is a system level block diagram of a typical RF receiver system with a baseband DF processor running the method described in this application.

The present invention can best be understood by initial consideration of FIG. 1.[1] FIG. 1 is a system diagram of an RF Direction Finding system. The array receives electromagnetic signals in the RF range that are then filtered for the desired frequency range and fed to high speed Analog-to-Digital Converters (A/D). There is one for each array element. It is also possible to reduce the number of receivers and A/D converters by utilizing multiplexing. As few as two receivers and two A/D converters could be used. The minimum number of elements needed is three and, in theory, there is no maximum number of elements and they can be positioned in any uniform circular pattern. The more array elements that are used the larger the array diameter relative to the wavelength could be without any remaining phase ambiguities. In practice and for this invention, somewhere between three and eleven array elements are employed in a circular pattern. The set of digital signals from the A/D converters are then sent to a Direction Finding (DF) processor for analysis.

[1] As used throughout this disclosure, element numbers enclosed in square brackets [ ] indicates that the referenced element is not shown in the instant drawing figure, but rather is displayed elsewhere in another drawing figure.

The method of the present invention comprised of several steps. All functions of the method of the instant invention are done in near real time, automatically, with no human intervention. The invention is most suitably implemented on a high-speed Field Programmable Gate Array (FPGA).

Figure 2:
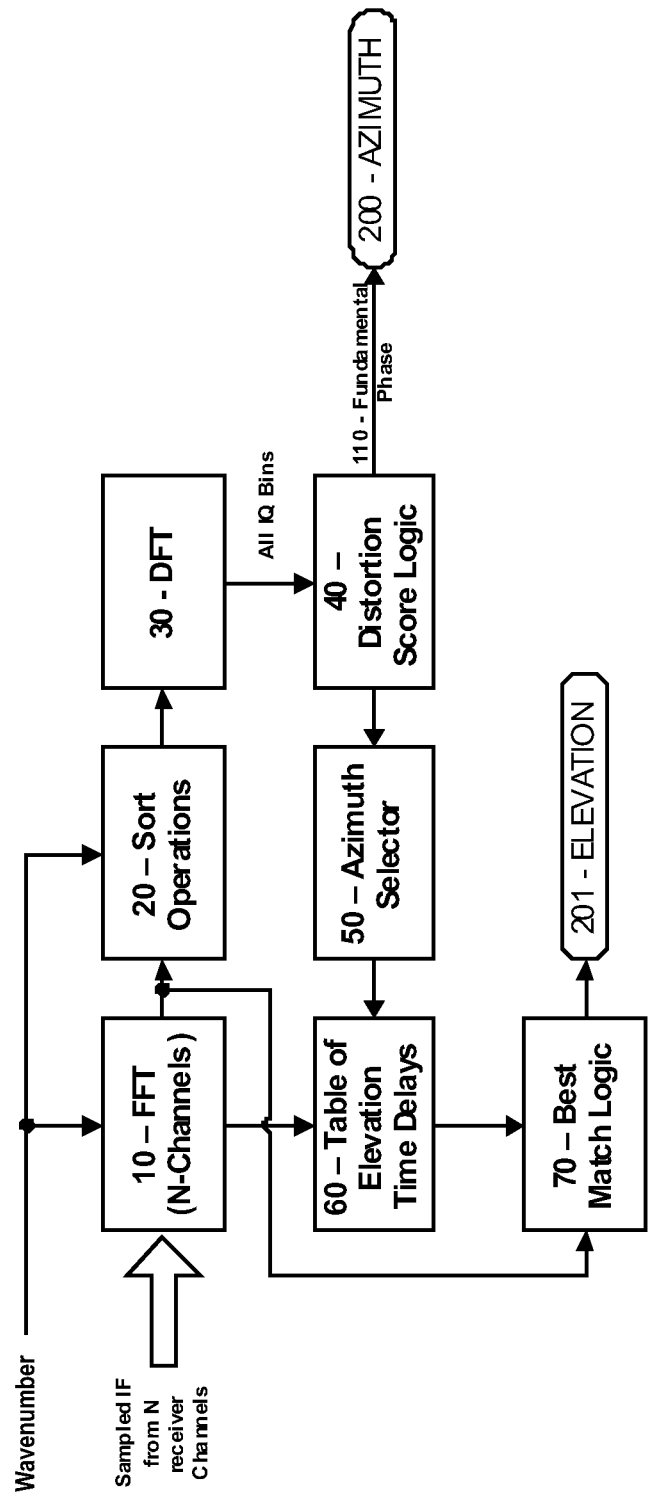
FIG. 2 is a drawing of the sequence executed by system of the present invention.

FIG. 2 outlines a functional block diagram of the invention. The set of digitized data streams are converted to the frequency domain by the FFT block 10. The FFT 10 subdivides the entire instantaneous bandwidth into distinct frequency components. The resolution and spacing of each component is determined by the size of the FFT and the sampling frequency of the A/D converters. If the same frequency bin position is taken across all channels then a set of frequency-related data is created. The invention then uses this set of frequency-related data to calculate a maximum likelihood azimuth and elevation value. All of these functions are described in more detail in the following Operation section of this patent application.

Besides the unique capability of simultaneously calculating azimuth and elevation for each frequency across the entire instantaneous bandwidth, this invention is also special in its amenability of a fixed point implementation. This makes it possible to host the algorithm on an FPGA in order to enable the calculations to be parallelized so that the operations can be performed in real time. By utilizing very narrow bin spacing's in the FTT, a substantial improvement in the signal to noise ratio is possible. This will enhance the azimuth and elevation accuracy for noisy signals above what was possible with traditional direction finding systems.

DIAGRAM REFERENCE NUMERALS

10 Multi-Channel, Variable Size Fast Fourier Transform (FFT)
20 Multi-Channel FFT Bin Sorter
30 Discrete Fourier Transform
40 Distortion Score Logic
50 Azimuth Selector
60 Table of Elevation Time Delays
70 Best Match Logic
110 Fundamental Phase
200 Azimuth
201 Elevation
300 Invention Operation The operation of the invention 300 is described here in this section. Each digitized, Intermediate Frequency signal channel is processed by a Fast Fourier Transform (FFT) 10. The frequency resolution or the bin spacing of the output is determined by the size of the FFT 10 and the sampling frequency. At this point, the data can be grouped into frequency data sets. Each frequency data set consists of the same bin number (frequency) across all array elements. Once a set is obtained, the next step is to remove the ambiguities introduced by the array geometry.

In order to remove error from phase ambiguities due to array element location, a series of sort operations 20 tries all possible phase flips for each array element, in parallel. The result is then fed into a Discrete Fourier Transform (DFT) 30. The size of the DFT 30 is determined by the set size which is the number of array elements elements. By comparing the magnitude from the DFT fundamental output and compare its magnitude with all the total magnitude from all the other DFT outputs, a distortion score will be generated by the distortion score logic 40. The distortion score is a function of the total ambiguity error and noise. The best score will then be selected by the distortion score logic 40. The best score is the DFT 30 output with the lowest distortion. This score corresponds to the correct arrival direction and therefore resolves the ambiguity introduced by the array geometry. Once the best score is obtained an absolute azimuth 200 is retrieved from the fundamental phase output 110, which is bin 1 of the DFT 30 output.

After the azimuth 200 is determined, the next step is to find elevation 201. RF signals that impinge the vector array from non-zero elevations result in apparent shorter time delays across the array as compared to those produced by lower elevation angles. As a result, a table of elevation time delays 60 is created and stored in a data repository for comparison to the incident signal being analyzed. This table 60 will then contain all the expected delays of the array elements signals for all possible elevation angles. The best match logic 70 finds the best fit in the table which indicates the correct elevation angle 201.

The output of this method is a set of azimuth 200 and elevation 201 pairs, each corresponding to a frequency within the instantaneous bandwidth. In total, the set of outputs spans the entire bandwidth as determined by the RF filters, and is an extremely reliable estimation of the position of the signal emitter.

Figure 3:
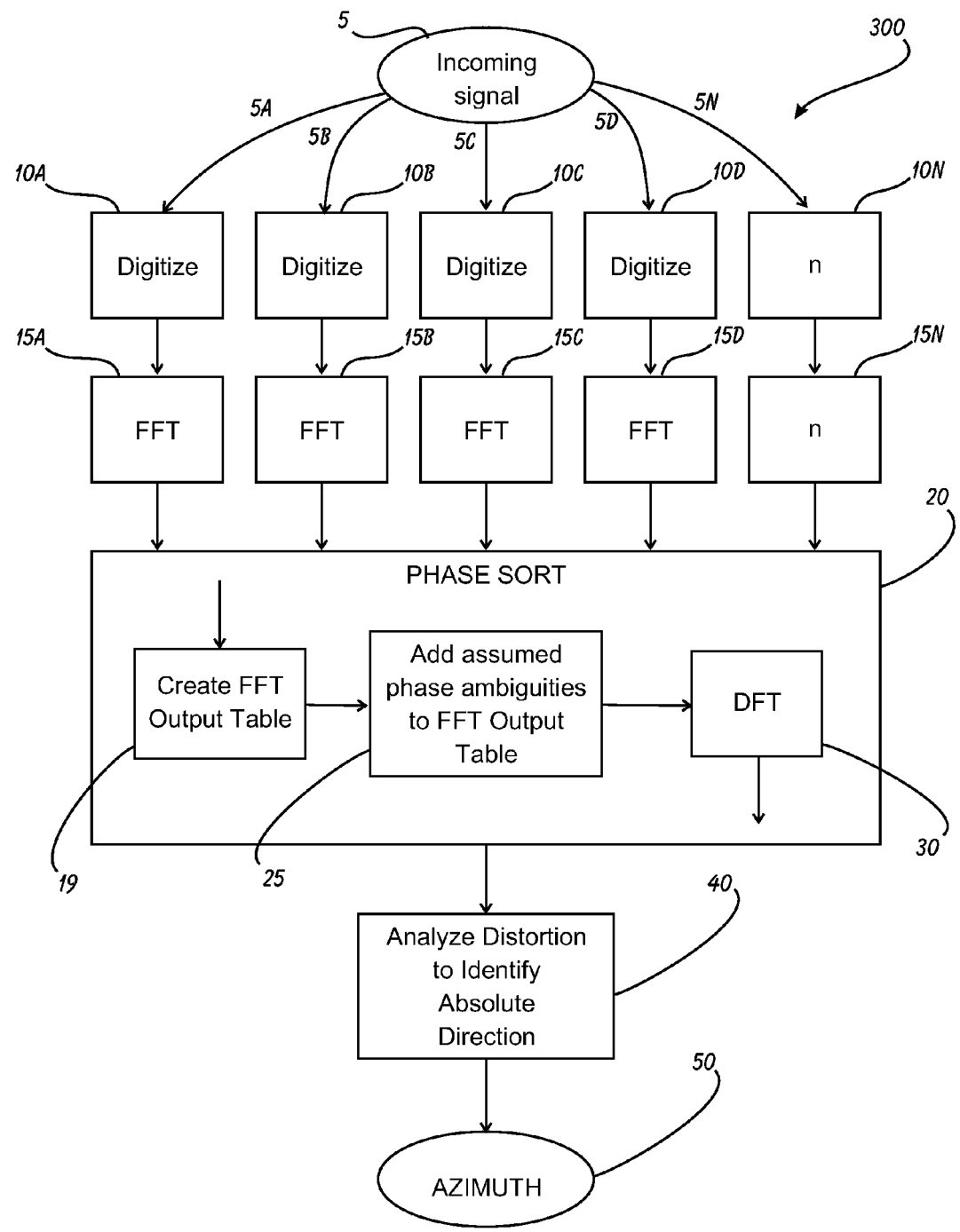
FIG. 3 is a block diagram depicting the method for determining emitter azimuth relative to the array.

FIG. 3 is a block diagram depicting the method for determining emitter azimuth relative to the array 300. The incoming signal 5 reaches and is received by each individual array element 5a-5n (where "n" is the number of array elements). Each element's signal is first digitized 10a-10n, and then passed through a Fast Fourier Transform (FFT) block in order to convert the digitized signal into the frequency domain. A set of data is created for each frequency data set across all array elements.

Assuming that the diameter of the array [1] is greater than ½ of the wavelength of the incoming signal, there will be phase error introduced between the different array elements (the greatest phase delta being between the nearest and the furthest element in the array [1] from the emitter). A phase sort operation 20 is conducted to resolve this phase error.

The phase sort 20 starts with the creation of an output table containing the output data from all FFT(s) 19 for one bin. The frequency bin output from each array element [1a-1n] being arranged in rows, with each element [1a-1n] filling the data for one row.

Next, the table is further populated with the data assumed to be the result of phase-related ambiguities, with the maximum number of such data rows being the same as the "wavenumber" (equivalent to (Thr)/Wavelength) 25.

Finally, the entire data table is passed through the DFT 30 in order to generate output at the fundamental I/Q output of the DFT 30 and all its other outputs. The phase of the fundamental DFT 30 output is also stored for later use. Those DFT 30 outputs are analyzed/scored in order to determine which array element phase combination has the greatest fundamental magnitude 40 relative to all other DFT outputs (lowest distortion). This identifies the closest array element [1a-1n] to the emitter (and therefore the general direction to the emitter. The output of the scoring step is the stored DFT 30 fundamental phase. This is the absolute azimuth 50 relative to the first array element. The azimuth 50 is an input to the elevation determining method 302. Because of pipelining the azimuth DFT 30 is instantly ready for the next set of frequency bins and the signals elevation can be derived without any additional delay in the next pipeline block.

Figure 4:
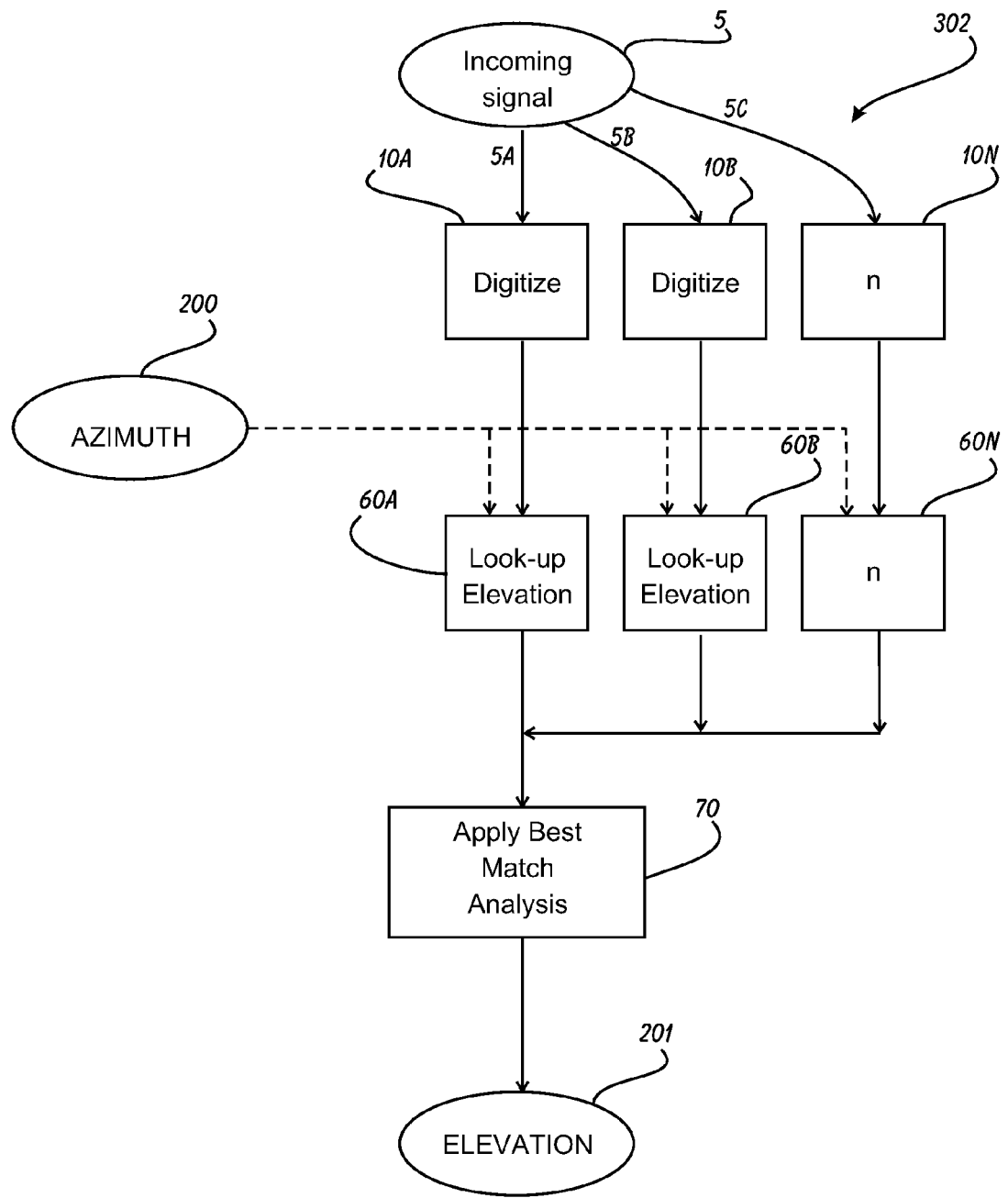
FIG. 4 is a block diagram depicting the method for determining emitter elevation relative to the array.

FIG. 4 is a block diagram depicting the method for determining emitter elevation relative to the array 302. The individual array element signals 5a-5n are digitized 10a-10n. This digitized array-specific data and the azimuth data 200 are used within a pre-established look-up table (for the array [1] 60a-60n. The table contains known delays in signal arrival times to the elements [1a-1n] of the array [1] for known emitter elevations (at known azimuths) starting from the previously determined azimuth angle. It is a simple matter of comparing the delay in arrival time of the signal 5 to the elements [1a-1n] to the known performance, and determining which elevation is the best match 70. This results in the elevation output 201 from the method 302.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An emitter locating system, comprising:
    an array of array elements in relative spaced relation;
    each said array element coupled to an analog-to-digital converter;
    each said analog-to-digital converter coupled to a frequency filter for filtering out all but the desired frequency range for a signal sent by the emitter and received at each said array element;
    a phase sort subsystem coupled to said analog-to-digital converters for determining the signal phase of a signal received at each said element, wherein said phase sort subsystem generates data for storage in a data repository associated with said phase sort subsystem, said data arranged in tables comprising frequency output data from said frequency filter and assumed phase ambiguity data;
    a discrete fourier transform generator subsystem coupled to said individual phase sort subsystems for applying a fourier transform thereto;
    comparing means for comparing an output signal magnitude at a fundamental bin of said discrete fourier transform subsystem with each harmonic output bin of said discrete fourier transform subsystem to generate a distortion score for each said signal received by each said array; and
    azimuth determining means for determining the azimuth of said received signal responsive to said distortion score.

2. The emitter locating system of claim 1, further comprising elevation determining means for determining the elevation of the emitter responsive to a comparison between the delay in said signal arrival time from each said element in said array and a series of known delays in signal arrival time to each said element in said array.

3. The emitter locating system of claim 2, wherein said known delays in signal arrival time from each said array element are stored in a data repository associated with said elevation determining means.

4. The emitter locating system of claim 3, wherein said known delays in signal arrival time from each said array element comprise data of received signals that had been sent from emitters at known elevation angles relative to said elements.

5. The emitter locating system of claim 2, wherein said array of elements comprises at least three elements in relative equal spaced relation around a circular perimeter.

6. The emitter locating system of claim 5, further comprising elevation determining means for determining the elevation of the emitter responsive to a comparison between the delay in said signal arrival time from each said element in said array and a series of known delays in signal arrival time to each said element in said array.

7. The emitter locating system of claim 6, wherein said known delays in signal arrival time from each said array element are stored in a data repository associated with said elevation determining means.

8. The emitter locating system of claim 7, wherein said known delays in signal arrival time from each said array element comprise data of received signals that had been sent from emitters at known elevation angles relative to said array.

9. The emitter locating system of claim 6, wherein said array of elements comprises at least three elements in relative equal spaced relation around a circular perimeter.

10. An emitter direction-finding method comprising the steps of:
    receiving an incoming signal at an array of individual elements to generate an analog element signal representative of said incoming signal as received by each said element;
    converting said analog array element signals into digital array element signals;
    filtering said individual digital array element signals to remove all of each said analog array element signal that is not in a predetermined frequency range;
    sorting said digital array element signals into distinct signal phases;
    processing said sorted digital array element signals through a discrete fourier transform subsystem;
    comparing the output at a fundamental frequency bin of said discrete fourier transform subsystem to the outputs at harmonic frequency bins of said discrete fourier transform subsystem to generate a distortion score;
    generating an azimuth angle to said emitter relative to said array responsive to said distortion score; and
    determining the emitter elevation responsive to said generated azimuth angle and the relative delay in said received incoming signal as received by each said array element.

11. The method of claim 10, wherein said sorting step comprises arranging said filtered digital array element signals into data tables in a repository, with said data tables being populated with frequency results for each said array element.

12. The method of claim 11, wherein said elevation determining means comprises comparing said relative delays to known relative delays for known emitter elevation angles relative to said array.

* * * * *